US012596616B1

(12) United States Patent
Amir et al.

(10) Patent No.: US 12,596,616 B1
(45) Date of Patent: Apr. 7, 2026

(54) SYSTEM AND METHOD FOR GENERATING A DIGITAL BACKUP OF DATABASE APPLICATIONS TO ALLOW JOIN OPERATIONS

(71) Applicant: Eon IO, Ltd., Tel Aviv (IL)

(72) Inventors: Orly Amir, Ramat Gan (IL); Assaf Natanzon, Tel Aviv (IL); Ilya Surdin, Ramat Gan (IL); Ron Kimchi, Tel Aviv (IL); Yaniv Ptashnik, Tel Mond (IL); Ofir Ehrlich, Tel Aviv (IL)

(73) Assignee: Eon IO, Ltd., Tel Aviv (IL)

( * ) Notice: Subject to any disclaimer, the term of this patent is extended or adjusted under 35 U.S.C. 154(b) by 0 days.

(21) Appl. No.: 19/042,483

(22) Filed: Jan. 31, 2025

(51) Int. Cl.
*G06F 16/20* (2019.01)
*G06F 11/1446* (2026.01)
*G06F 16/2455* (2019.01)

(52) U.S. Cl.
CPC ...... *G06F 11/1451* (2013.01); *G06F 16/2456* (2019.01); *G06F 2201/80* (2013.01)

(58) Field of Classification Search
None
See application file for complete search history.

(56) References Cited

U.S. PATENT DOCUMENTS

| | | | |
|---|---|---|---|
| 6,553,366 B1 | 4/2003 | Miller et al. | |
| 7,162,464 B1 | 1/2007 | Miller et al. | |
| 10,922,303 B1 * | 2/2021 | Bruck | G06F 16/2365 |
| 11,087,054 B2 | 8/2021 | Austern et al. | |
| 2016/0078085 A1 * | 3/2016 | Hu | G06F 16/273 |
| | | | 707/765 |
| 2022/0156238 A1 * | 5/2022 | Kunzle | G06F 16/1815 |
| 2023/0222038 A1 * | 7/2023 | Kunzle | G06F 16/2365 |
| | | | 707/648 |
| 2023/0252233 A1 | 8/2023 | Gutierrez et al. | |
| 2023/0306061 A1 | 9/2023 | Bui et al. | |
| 2024/0070448 A1 | 2/2024 | Sagar et al. | |
| 2024/0252154 A1 | 8/2024 | Vermeulen et al. | |
| 2024/0362278 A1 | 10/2024 | PerezLeon et al. | |
| 2024/0394249 A1 | 11/2024 | Cunningham et al. | |
| 2024/0419706 A1 | 12/2024 | Gutierrez | |
| 2025/0013649 A1 | 1/2025 | Gladwin et al. | |
| 2025/0021148 A1 | 1/2025 | Gladwin et al. | |
| 2025/0021560 A1 | 1/2025 | Gladwin et al. | |
| 2025/0021566 A1 | 1/2025 | Gladwin et al. | |
| 2025/0077511 A1 | 3/2025 | Zhao et al. | |
| 2025/0110948 A1 | 4/2025 | Nguyen et al. | |
| 2025/0152337 A1 | 5/2025 | Bruchman et al. | |
| 2025/0156413 A1 | 5/2025 | Barkan et al. | |

* cited by examiner

*Primary Examiner* — Jau Shya Meng
(74) *Attorney, Agent, or Firm* — M&B IP Analysts, LLC

(57) ABSTRACT

A method system for generating a digital backup of database applications to allow join operations. The method includes accessing a plurality of database applications hosted on a plurality of virtual machines; exporting data stored in the database applications to a plurality of files, each file utilizing a column-oriented storage format; generating a joinable backup by at least computing searchable values for each table in the plurality of database applications; searching for joinable database tables in the joinable backup; and generating a digital backup of the database application based on the plurality of files and the joinable backup, wherein the digital backup includes at least a list of joinable database tables.

19 Claims, 6 Drawing Sheets

S 310

ACCESS A DATABASE APPLICATION

S 320

DETERMINE A RETRIEVAL KEY OF THE DATABASE
APPLICATION

S 330

GENERATE A PLURALITY OF QUERIES BASED ON
THE RETRIEVAL KEY

S 340

EXPORT DATA FROM THE DATABASE BASED ON A
QUERY RESULT INTO A PLURALITY OF FILES

S 350

CREATE A JOINABLE DATABASE BACKUP

S 360

GENERATE A BACKUP BASED ON THE PLURALITY OF
COLUMN  -ORIENTED DATA STORAGE FILES

S510
RECEIVE DATABASE TABLE FOR A JOIN OPERATION

S520
SEARCH FOR JOINABLE COLUMNS

S530
PERFORM A JOIN OPERATION TO CREATE A JOINED TABLE

S540
BACKUP THE JOINED TABLE

SYSTEM AND METHOD FOR GENERATING A DIGITAL BACKUP OF DATABASE APPLICATIONS TO ALLOW JOIN OPERATIONS

TECHNICAL FIELD

The present disclosure relates generally to digital backup and restoration, and specifically to performing join operations on database backups.

BACKGROUND

A join operation in a database is used to combine rows from two or more tables based on a related column between them. Joins are fundamental in relational databases (SQL databases) because data is often stored across multiple tables to avoid redundancy and ensure consistency. Join operations can also be performed in non-relational databases.

A non-relational database (often called NoSQL database) is a type of database that does not use the traditional table-based relational structure (rows and columns) like SQL databases. Instead, it uses flexible data models that allow for scalability, speed, and diverse data storage. Examples of NoSQL databases include MongoDB and CouchDB. Examples of SQL databases include PostgreSQL, MySQL, MSSQL, and the like.

A join operation can be performed among two or more tables in the same databases. In some instances, a join operation may be performed among databases of the same type. Of course, a join operation cannot be performed among databases of different types (e.g., PostgreSQL and MongoDB) or even between two different databases of the same type (e.g., PostgreSQL and MySQL).

Database backup is the process of creating copies of data to protect against data loss, corruption, or hardware failure. Backups ensure that information can be restored if something goes wrong, maintaining data availability and minimizing downtime. There are several types of backups used to meet different recovery needs. Currently, backups do not support join operations, let alone a join operation between different types of databases.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include accessing a plurality of database applications hosted on a plurality of virtual machines. The method may also include exporting data stored in the database applications to a plurality of files, each file utilizing a column-oriented storage format; generating a joinable backup by at least computing searchable values for each table in the plurality of database applications; searching for joinable database tables in the joinable backup; and generating a digital backup of the database application based on the plurality of files and the joinable backup, where the digital backup includes at least a list of joinable database tables. Other embodiments of this aspect include corresponding computer systems, apparatus, and computer programs recorded on one or more computer storage devices, each configured to perform the actions of the methods.

Implementations may include one or more of the following features. The method may include: joining, upon an user selection, an input database table with at least one joinable database table specified in the digital backup. The method where generating the joinable backup further may include: for each table in the plurality of database applications: determining a category for each column; normalizing column values of each column; and computing searchable values. The method where determining the category of each column further may include: prompting a large language model (LLM) with at least a set of values of a column; and saving original column names in the metadata of the digital backups. The method where normalizing the column values of each column further may include: applying a normalization function selected based on the category of a respective column; saving the normalized column values in digital backups; and saving a reverse normalization function in metadata of the digital backups. The method may include: generating searchable values by applying a MinHash function on normalized values in each column of each database table in the digital backups; and calculating a set of n' minimal hash values on all rows of each database table, where the parameter n' is preconfigured. The method where searching for joinable columns further may include: searching for columns having a number of k' identical searchable values; where k' is a number smaller than the number of n'. The method where searching for joinable columns further may include: identifying candidate joinable columns based on a hash map; and determining if each candidate joinable column includes a set of k' identical searchable values; where k' is a number smaller than the number of n'. The method where the joinable database tables are of different database applications. Implementations of the described techniques may include hardware, a method or process, or a computer tangible medium.

In one general aspect, non-transitory computer-readable medium may include one or more instructions that, when executed by one or more processors of a device, cause the device to: access a plurality of database applications hosted on a plurality of virtual machines; export data stored in the database applications to a plurality of files, each file utilizing a column-oriented storage format generate a joinable backup by at least computing searchable values for each table in the plurality of database applications search for joinable database tables in the joinable backup; and generate a digital backup of the database application based on the plurality of files and the joinable backup, where the digital backup includes at least a list of joinable database tables. Other embodiments of this aspect include corresponding computer systems, apparatus, and computer programs recorded on one or more computer storage devices, each configured to perform the actions of the methods.

In one general aspect, the system may include one or more processors. The system may also include access to a plurality of database applications hosted on a plurality of virtual machines. The system may furthermore include export data stored in the database applications to a plurality of files, each file utilizing a column-oriented storage format. The system may in addition include generating a joinable backup by at least computing searchable values for each table in the plurality of database applications. The system may moreover include search for joinable database tables in the joinable backup. The system may also include generating a digital backup of the database application based on the plurality of files and the joinable backup, where the digital backup includes at least a list of joinable database tables. Other embodiments of this aspect include corresponding computer systems, apparatus, and computer programs recorded on one or more computer storage devices, each configured to perform the actions of the methods.

Implementations may include one or more of the following features. The system where the one or more processors are further configured to: join, upon a user selection, an input database table with at least one joinable database table specified in the digital backup. The system where the one or more processors, when generating the joinable backup, are configured to: for each table in the plurality of database applications: determine a category for each column; normalize column values of each column; and compute searchable values. The system where the one or more processors, when determining the category of each column, are configured to: prompt a large language model (LLM) with at least a set of values of a column; and save original column names in the metadata of the digital backups. The system where the one or more processors, when normalizing the column values of each column, are configured to: apply a normalization function selected based on the category of a respective column; save the normalized column values in digital backups; and save a reverse normalization function in metadata of the digital backups. The system where the one or more processors are further configured to: generate searchable values by applying a MinHash function on normalized values in each column of each database table in the digital backups; and calculate a set of n' minimal hash values on all rows of each database table, where the parameter n' is preconfigured. The system where the one or more processors, when searching for joinable columns, are configured to: search for columns having a number of k' identical searchable values; where k' is a number smaller than the number of n'. The system where the one or more processors, when searching for joinable columns, are configured to: identify candidate joinable columns based on a hash map; and determine if each candidate joinable column includes a set of k' identical searchable values; and where k' is a number smaller than the number of n'. The system where the joinable database tables are of different database applications. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
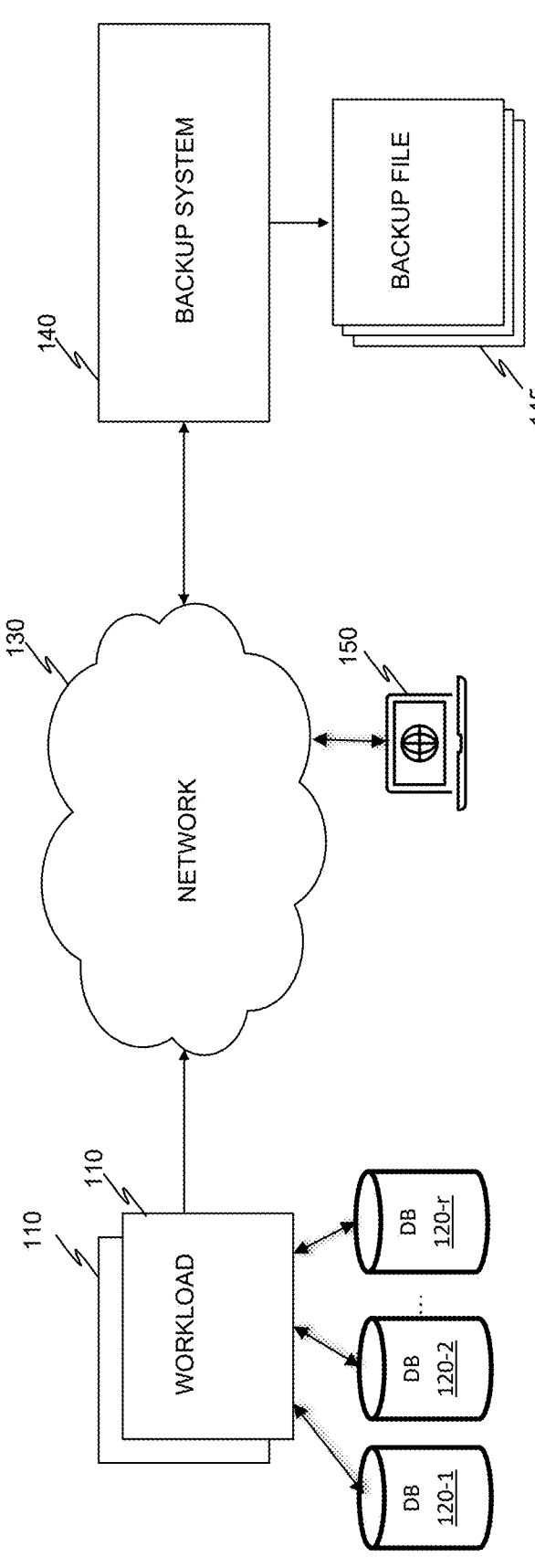
FIG. 1 is an example network diagram including a database backup system, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Database backup is the process of creating copies of data to protect against data loss, corruption, or hardware failure. Backups ensure that information can be restored if something goes wrong, maintaining data availability and minimizing downtime. There are several types of backups used to meet different recovery needs. A full backup captures the entire database, offering a complete snapshot at a specific point in time. Incremental backups, on the other hand, store only the changes made since the last backup, making them more space-efficient but requiring all previous backups for a full restore. Differential backups store changes made since the last full backup, striking a balance between efficiency and ease of recovery.

Cloud-based databases can be implemented as managed databases, such as Amazon® RDS, or by deploying a virtual machine, such as an Amazon® EC2 instance with a database application installed thereon. Such a machine can include many temporary files which occupy a large amount of storage space. Additionally, an older database backup may utilize a previous version of the database application, such that when it is restored might cause a cybersecurity risk, as an outdated application.

The disclosed embodiments allow to perform join operations on databases of the same types, different types, or with the same database. A join operation in a database is used to combine rows from two or more tables based on a related column between them. According to an embodiment, the join operation is enabled on a database backup being generated in an efficient way to solve a number of technical problems, such as slow backup and recovery, and slow execution of join operations. It should be emphasized that currently there is no solution in the related art that allows for performing join operations among multiple tables residing in different databases of different types (e.g., MySQL and MongoDB).

The disclosed embodiments allow considering multiple tables from the same or different databases, normalizing the contents of data, and unifying the naming of the columns. The join operation is performed by searching for columns in different tables with substantially similar content and joining such columns. The search is performed on pre-computed hash values that allow fast operation while saving on compute resources.

FIG. 1 is an example network diagram including a database backup system, utilized to describe some disclosed embodiments. As illustrated in FIG. 1, a plurality of databases 120-1, 120-2, . . . , 120-r are backed up by the backup system 140 into backup files 145. Database 120 may include a database application, a database management system (DBMS), a combination thereof, and the like. In some embodiment, a database 120 may be a column-oriented database, a relational database, a tabular relational database, a document-oriented database, and the like. For example, a database 120-1 is implemented using MySQL and a database 120-1 is MongoDB. In an embodiment, database 120 may include metadata, such as a database schema. In some embodiments, the database schema includes a data structure, such as a table, including a plurality of keys, at least a portion of which correspond to columns of the table.

In certain embodiments, the databases 120 are deployed on one or more workloads 110. In an embodiment, workload 110 is a physical computing device, a virtual computing device (e.g., a virtual machine), a combination thereof, and the like. In some embodiments, a workload 110 is a software container. In an embodiment, a software container is deployed on a software container platform, such as Kubernetes®, Docker®, and the like.

According to an embodiment, a workload 110 is implemented as a virtual machine, a software container, a serverless function, a combination thereof, and the like. In some embodiments, a database 120 is implemented as a managed database, for example utilizing Amazon® RDS. In an embodiment, a virtual machine is deployed as an Amazon® EC2 instance. A software container is deployed on a container platform such as Kubernetes®, Docker®, and the like. In some embodiments, a serverless function is deployed as an Amazon® Lambda function.

In an embodiment, workload 110 is configured to provide access to database 120, for example, over a network 130. In some embodiments, a cloud computing infrastructure is implemented on network 130. For example, in an embodiment, a cloud computing infrastructure is Amazon® Web Services (AWS), Google® Cloud Platform (GCP), Microsoft® Azure, and the like. In certain embodiments, the cloud computing infrastructure is utilized to deploy a cloud computing environment. In an embodiment, a cloud computing environment is a virtual private cloud (VPC), a virtual network (VNet), a virtual private network (VPN), a combination thereof, and the like.

In some embodiments, workload 110 is configured to provide access to database 120 to a database backup system 140 (also referred to as a backup system 140). In an embodiment, backup system 140 is configured to generate a backup of databases 120. In an embodiment, backup system 140 is implemented as a virtual machine, a software container, a serverless function, a combination thereof, and the like.

In an embodiment, backup system 140 is configured to generate a backup of a database by determining a retrieval key of database 120. For example, the data backup includes only data of the database, only data of the database includes data exported from the database, a database schema, a combination thereof, and the like.

According to an embodiment, data, information, and the like that allow the generation of a restored machine include a filesystem, a directory, a registry, configuration information, software product keys, a combination thereof, and the like. For example, according to an embodiment, machine backup includes an identifier of an operating system (such as Windows®, Linux®, etc.), an identifier of a database application (e.g., Apache® Derby), a filesystem, a registry file, a configuration file, a combination thereof, and the like.

Backup system 140 is configured to generate a restored database from the backup files 145. The restored database contains original data prior to backup regardless of the changes made during the backup process.

In an embodiment, backup system 140 is configured to generate a data backup based on the data stored in database 120. In certain embodiments, data backup includes a plurality of backup files 145. In an embodiment, the backup files 145 are a plurality of data files, stored each as a column-oriented data file. A column-oriented data file is, for example, Apache® Parquet. In an embodiment, values of each column of the database are stored in serial, contiguous, and the like, memory locations, which allows several benefits, such as improved column-wise compression and reduced query execution processing by reading only the column and not an entire row of data, where the contents of the row may not be relevant to the query.

Backup system 140 may be configured to determine a retrieval key of the database. The retrieval key may be any key, value, keyword, index, or the like. To this end, backup system 140 is configured to generate a plurality of queries based on the retrieval key, each query returning a plurality of rows of data from the database. The plurality of rows may be stored as at least a column-oriented data file, e.g., the backup files 145.

According to an embodiment, a retrieval key is a database key that includes values that are unique for each row. For example, a retrieval key is, in an embodiment, an index value. As no two rows can have the same index value, an index value can be used as a retrieval key. In some embodiments, a retrieval key is a composite key, i.e., a combination of a key value of a first column and a key value of a second column, which together form a unique value.

According to the disclosed embodiments, the backup system 140 generates metadata that facilitates join operations between tables. These tables may originate from the same database 120 or from different databases (e.g., 120-1 or 120-2), which can be of the same or different types. The metadata includes the content category of each column in every table within the database 120. In one embodiment, categorizing the content involves running, by a generative AI system, a large language model (LLM) on the contents of each column to provide a description of that content. This generated description may be then used as the column name, ensuring a unified naming convention across different tables. It is important to note that while the name of a column in a table remains unchanged, it serves as a unified designation for identifying tables that can be joined.

For example, columns that contain residential addresses in different tables may be labeled as "home address," "place of residency," or "mailing address." While the format of the content may be similar, or perhaps even identical, a language model (LLM) would classify the contents of these columns under the same description. This information could then be processed using the LLM for classification. An example prompt may include:

"What would be a category for a column in a database having the following column values: 150 Morristown rd., Basking Ridge, NJ; 201 Broadway Ave, NY; 130 main street, Springfield NJ"

In one embodiment, the same prompt and the same large language model (LLM) are utilized to unify the column names, ensuring consistent results. An LLM can include, but is not limited to, various types of large language models, such as GPT-4 (OpenAI), Claude (Anthropic), Gemini (Google), and LLaMA (Meta), among others. In an embodiment, the prompt may be a preconfigured template, where the contents of the columns are the variable parts of this template. In one example, only a subset of the values from a column is included in the prompt and provided to the language model (LLM). This approach is used to improve response time and decrease the computational resources required by the LLM. The LLM may be operated by a generative AI system, which may be defined as the processing circuitry of the backup system 140. In one embodiment, the generative AI system is external to system 140 and is accessed by the backup system 140 through an API.

The disclosed embodiments include normalizing the values in columns. This normalization is carried out using a function that is chosen based on the category assigned to each column. For instance, columns that represent dates are standardized to a uniform format (DD, MM, YYYY). In one example embodiment, the normalization function can be executed by an LLM by providing an appropriate prompt or through processes designed to enable such normalization.

In one embodiment, the original column names and their corresponding unified column names are stored as metadata for the backup table. Additionally, both the original values and their normalized equivalents are saved in the database backup. Alternatively, the normalized values can be stored in the backup, while a reverse normalization function may be included in the backup metadata of the backup table. As previously mentioned, the database backup can include multiple backup files, each formatted as a column-oriented data file.

In one embodiment, the database backup includes unified column names and normalized column values, which are used to perform join operations among database tables. These tables can belong to the same type of database or different types of databases. To this end, a user of a user device 150 selects at least one table to perform a join operation on. A user device 150 may be a laptop, a personal computer a smartphone, or any device that can access the database backup system 140. Access is via, for example, a web portal. It should be noted that NoSQL databases do not maintain data in tables. According to the disclosed embodiments, data from NoSQL databases is stored in a table format that users can access. For example, in MongoDB, a collection of documents is used, where each document is converted into a row. Common files of the documents become columns, while any remaining files are consolidated into a final column.

In an embodiment, the process begins by searching for joinable columns. A joinable column is one found in backup files that belongs to a table different from the input table. In this context, a joinable column must be of the same type and share values with at least one of the columns in the input table. To locate joinable columns, a similarity hash is used in this method. Specifically, a number of searchable values (denoted as 'n') are computed using a hash function, such as a min hash function. In this case, 'n' can be a preconfigured parameter (e.g., n=1000), a percentage of the total number of values in the column (e.g., n=5%), or a combination of both.

In this embodiment, hash values are computed based on the normalized values. The computed hash values may also be saved in backup files. In an embodiment, the parameter 'n' is set based on the size of a table. That is, the more entries in the table, the higher the value of 'n'. Therefore, different tables may have different values for 'n. A similarity search is conducted to identify whether two columns from different tables have 'k' matching values. The parameter 'k' is a pre-configured number that is smaller than the value of the parameter, 'n'. If two or more columns share similar 'k' hash values, they are considered joinable columns. The similar hash values may be identical or substantially alike.

In an embodiment, the similarity search for joinable columns is performed on columns of the same category (e.g., date, last name, etc.). This would provide a fast response and reduce the compute resources consumed by backup system 140. In some embodiments, the similarity search is performed on the tables stored in the backups. The hash values are computed during the backup process.

In one embodiment, the backup system 140 maintains a map, referred to as a "hash map," which associates hash values with a list of tables that include the corresponding hash value. When a new column is added, system 140 computes hash values for this new column. Using the hash map, system 140 identifies tables that can be utilized to locate those that may include values similar to the new column's values. It then checks the intersecting columns in these identified tables to determine if they share 'k' common values. This process enables a fast search for joinable columns.

Backup system 140 performs a join operation between tables that contain joinable columns. The resulting joined tables from such operations can be saved in backup files 145. In an embodiment, users can query or conduct other operations on the joined. In some configurations, when no joinable columns are found, system 140 informs the user a join operation cannot be performed.

Figure 2:
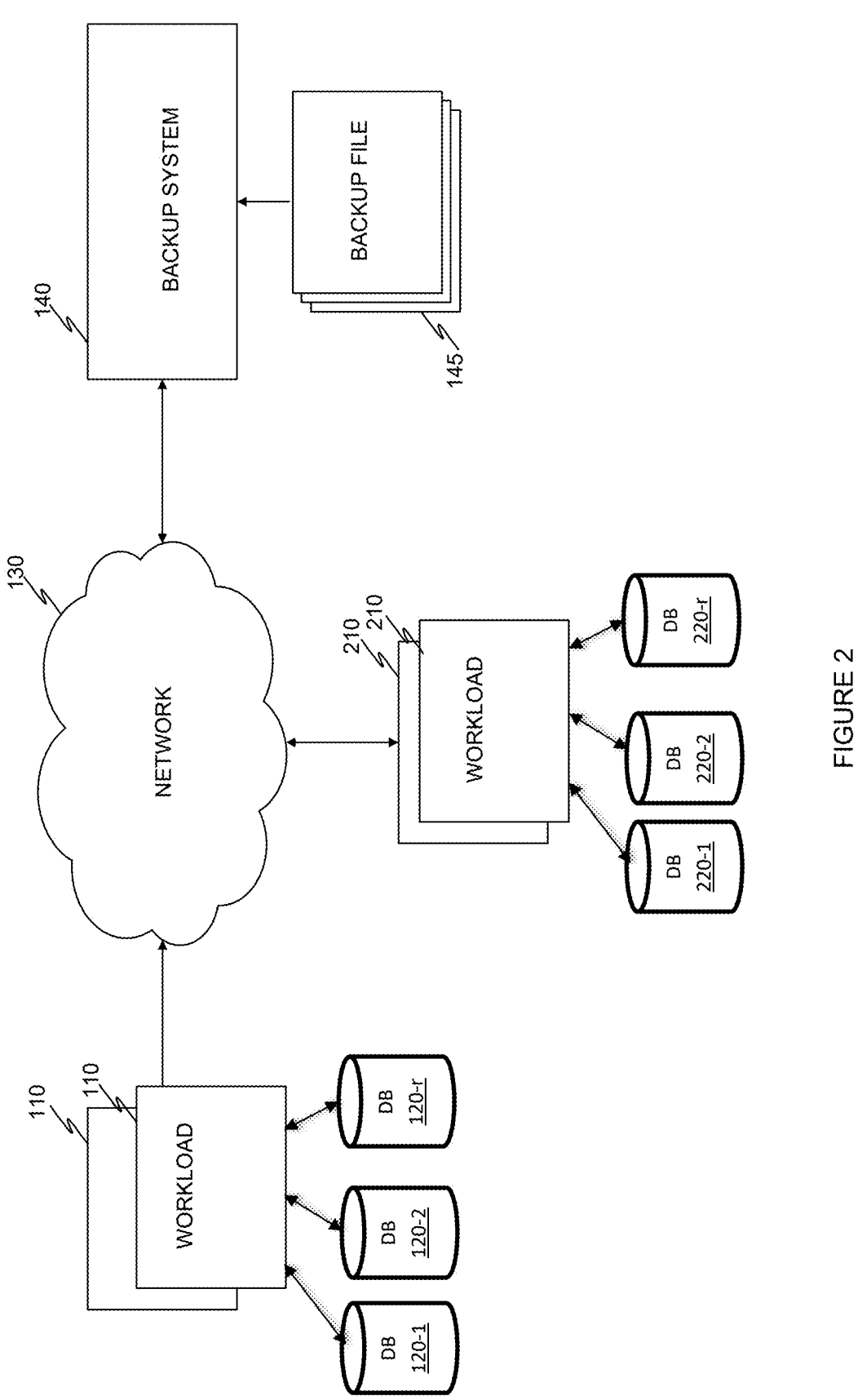
FIG. 2 is an example network diagram of a backup system performing a database restoration, utilized to describe an embodiment.

In one embodiment, a user can use their device (user device 150) to query which tables can be joined with a specified input table. In response, system 140 provides a list of candidate tables that are compatible for joining with the given input table. FIG. 2 is an example network diagram of a backup system performing a database restoration, utilized to describe an embodiment. According to an embodiment, a backup system 140 is configured to receive a request to restore a database application, including the database data thereof.

In an embodiment, backup system 140 is configured to instruct an orchestrator (not shown), other provisioning device, and the like, to deploy a restored workload 210, which corresponds to one or more workloads 110. For example, in an embodiment, the restored workload is deployed from an auto-scaling group (ASG) which is deployed in a VPC of a cloud computing environment.

Backup system 140 is configured to restore the restored workload 210 based on a file-level backup, a block-level backup, a plurality of software keys, and the like. For example, in an embodiment, the backup system 140 is configured to generate, provision, etc., an empty bootable machine volume. In an embodiment, a bootable machine volume is implemented utilizing Amazon® Elastic Block Storage (EBS).

According to the disclosed embodiments, during database restoration, the naming of the columns and their normalized values are converted to their original names and values, respectively. When the original values are saved in the backup files such values are used in the restoration process.

When the normalizing functions are saved in the backup files, reverse normalized functions are used to restore the original values.

According to some embodiments, data of the backup files 145 is copied into databases 220-1, 220-2, . . . , 220-r. In certain embodiments, a workload 210 is configured to query the backup files 145 while the data of the backup files 145 is being written, copied, etc., to, for example, a database 220-1. This provides access to the data while performing the restoration. For example, a database application of a database 220 is configured to receive a query for execution thereon. Here, the database application is configured to execute the query on the backup data files 145 in response to determining that backup data files 145 have not yet been completely written to database 220.

Figure 3:
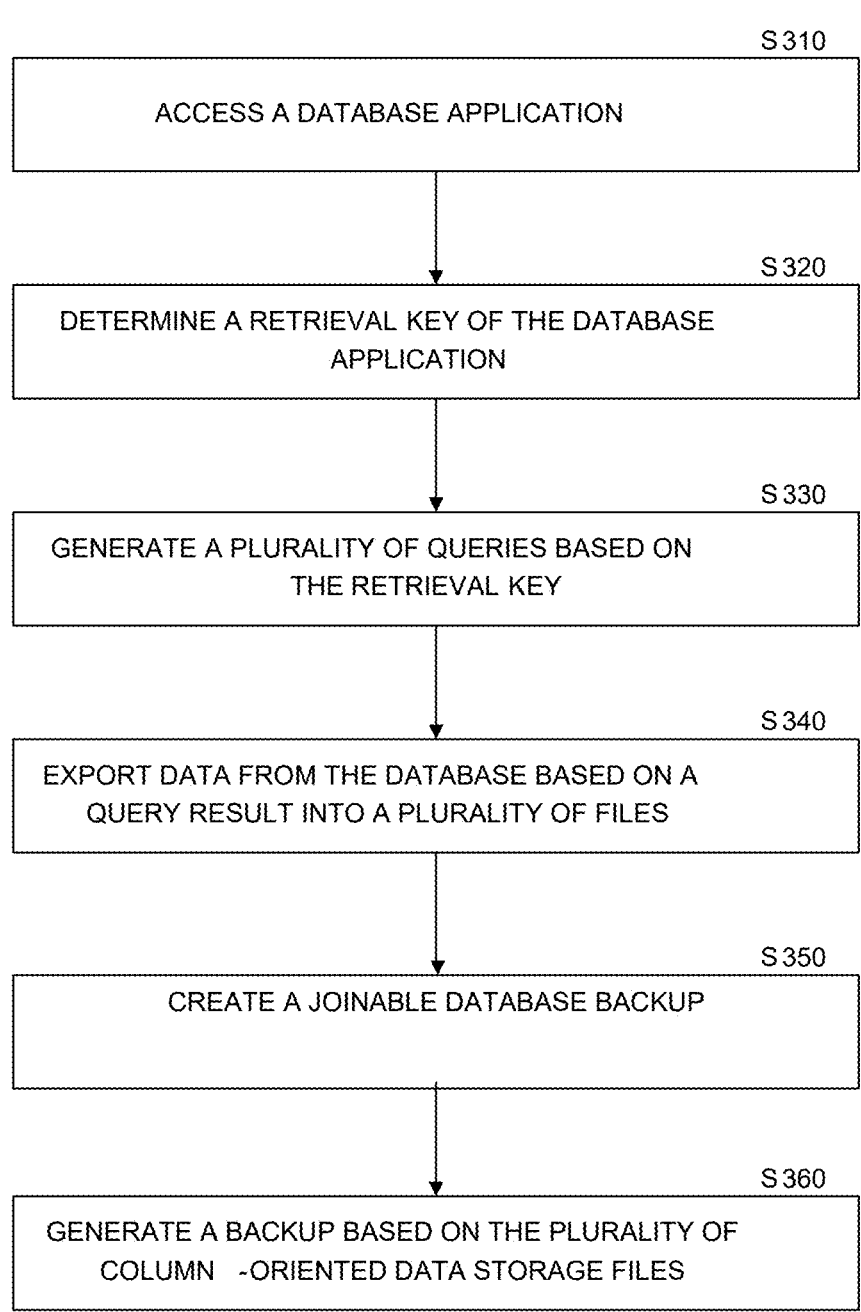
FIG. 3 is an example flowchart of a method for generating a database backup, implemented in accordance with an embodiment.

FIG. 3 is an example flowchart of a method for generating a database backup that can be utilized for join operations in accordance with an embodiment. The method may be performed by the backup system 140. In an embodiment, generating a database backup includes generating a backup of the machine hosting the database (which omits the data of the database) and generating a backup of the data of the database as two distinct backups.

At S310, a database application is accessed. In an embodiment, accessing a database application includes detecting a database application deployed in a computing environment, such as a cloud computing environment. According to some embodiments, accessing a database application includes receiving a token, a credential, a combination thereof, and the like, to access the database. In an embodiment, accessing the database application includes accessing a machine, a workload, and the like, on which the database application is deployed.

According to certain embodiments, the database application is a stand-alone database application deployed on a virtual machine. The database application may include a SQL database or a NoSQL database. Examples of NoSQL databases include MongoDB® and CouchDB®. Examples of SQL databases include PostgreSQL, MySQL, MSSQL, and the like. It should be noted that the backup process is performed for any type of database application. That is, the same process can be performed for SQL, NoSQL, or any other type of database application.

NoSQL databases use different terminology than SQL (relational) databases for the data they store. For example, in SQL databases, a "table" corresponds to a "collection," a "row" is similar to a "document," a "column" is equivalent to a "field," and a "primary key" is represented by an "ID," which serves as the default unique identifier. This description will primarily employ terminology from SQL databases for clarity, but the disclosed embodiments are not limited to these types of databases.

At S320, a retrieval key of the database is determined. In some embodiments, the retrieval key is an index of rows, for example. The retrieval key may include a value assigned to each row, which is a unique value, such that no two rows include the same value of the retrieval key.

In some embodiments, a retrieval key is generated based on a composite of multiple-column identifiers. For example, in an embodiment, two identifiers, each of a distinct column, form together a retrieval key. In certain embodiments, a plurality of retrieval keys are selected, each retrieval key corresponding to a table of the database.

At S330, data is exported from the database. The exported data may include at least tables and their contents. In an embodiment, exporting data from the database includes generating a plurality of queries. In an embodiment, the plurality of queries are generated, each based on a value range of the retrieval key. For example, in an embodiment, a first query of the plurality of queries is generated based on a value range of '0' to '10,000' of the retrieval key, and a second query of the plurality of queries is generated based on a value range of '10,001' to '20,000'. In an embodiment, there is no overlap between the values of the retrieval key for each of the generated queries.

In an embodiment, the query is generated in a query language, such as SQL. In an embodiment, data is exported from the database utilizing a logical backup. For example, in a PostgreSQL database, a pg_dump command is utilized to export data from a database application to a logical backup. According to an embodiment, a logical backup includes schema and data as query language (e.g., SQL) commands, binary format, and the like. In an embodiment, a logical backup is a consistent snapshot, as opposed to a physical backup, which includes, for example, configuration files, raw files, directories, etc. As another example, in MongoDB, an export command mongoexport can be utilized to export collections (tables).

At S340, a plurality of backup files are generated. In an embodiment, the plurality of backup files are generated in a column-oriented data format, such as Apache® Parquet. In some embodiments, the plurality of backup files are generated such that a file, a group of files, etc., corresponds to a result of executing a query of the plurality of queries. Thus, data is exported from the database into a plurality of backup files.

In an embodiment, data is exported from the database application into the plurality of backup files by generating the plurality of queries, executing each query on the database, receiving a result for each query, and storing the results as data files in a column-oriented data format.

In some embodiments, for example, where a logical backup is generated (e.g., utilizing pg_dump command), the plurality of backup files are generated by converting the logical backup into a plurality of column-oriented data format files.

In some embodiments, for example, when collections are exported (e.g., utilizing mongoexport/or mongodump command), the plurality of backup files are generated by converting the logical backup into a plurality of column-oriented data format files.

At S350, a process for generating a database backup that supports join operations (referred to as a "joinable backup") is performed. This process is executed on all exported backup files and includes unifying column names, normalizing column values, and computing hash values for similarity searches.

Figure 4:
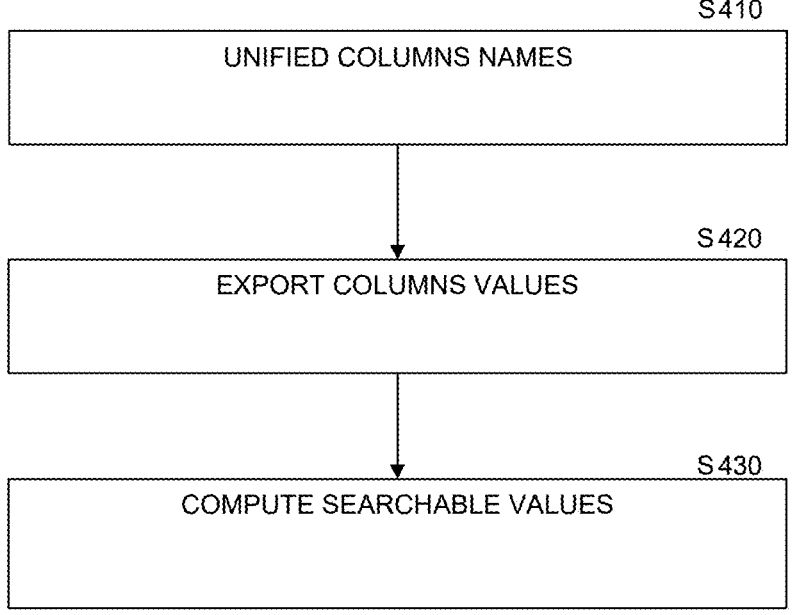
FIG. 4 is an example flowchart of a method for creating a joinable database backup implemented according to an embodiment.

Reference is now made to FIG. 4, which illustrates the process of S340 for generating a joinable backup according to an embodiment. FIG. 4 may be executed by the backup system 140. At S410, the names of the columns in an exported table are standardized or unified. This process involves prompting a large language model (LLM) with the contents of each column to determine the appropriate category for that column. An example of such a prompt is provided above. Additionally, the original column name and its corresponding standardized name are stored in a metadata backup. The original name can be added to a table created by a join operation.

At S420, the values in an exported table are normalized. This normalization process can be carried out using a normalization function, a large language model (LLM), or a combination of both. The specific normalization function and/or the prompt given to the LLM is selected based on the category of each respective column.

For instance, a normalization function may involve several tasks, such as converting date values to a consistent format, standardizing physical addresses to USPS format, or reformatting personal names to follow the structure "Last Name, First Name," among others.

In an example embodiment, when employing an LLM for normalization, the prompt will include the type of category, a description of the requested format, and the contents of the column that need to be normalized. For example, the instruction might be to change the following date values to the format "DD, MM, YYYY." A template for such a prompt may be preconfigured for ease of use.

In an embodiment, original column values and their respective normalized values' names are saved in the backup. In another embodiment, only the normalized values are saved in the backup, while the reverse normalization function is backup metadata. The reverse normalization function when executed returns the normalized values to their exact original values. That is, there is no data loss in the normalization process.

Following is an example demonstrating the operation of S340 and S350. Tables 1.1 and 1.2 are shown.

TABLE 1.1.

| Computer Name | IP Address | CPU Type |
| --- | --- | --- |
| PC-001 | 192.168.1.1 | Intel i5 |
| PC-002 | 192.168.1.2 | Intel i7 |
| PC-003 | 192.168.1.3 | AMD Ryzen 5 |
| PC-004 | 192.168.1.4 | AMD Ryzen 7 |
| PC-005 | 192.168.1.5 | Intel i9 |
| PC-006 | 192.168.1.6 | AMD Ryzen 9 |
| PC-007 | 192.168.1.7 | Intel Xeon |
| PC-008 | 192.168.1.8 | AMD EPYC |
| PC-009 | 192.168.1.9 | Apple M1 |
| PC-010 | 192.168.1.10 | Apple M2 |

TABLE 1.2.

| Hexadecimal IP Address | Memory Size |
| --- | --- |
| C0A80101 | 64 GB |
| C0A80102 | 32 GB |
| C0A80103 | 32 GB |
| C0A80104 | 8 GB |
| C0A80105 | 128 GB |
| 0A000001 | 64 GB |
| 0A000002 | 8 GB |

For example, when querying a language model, the column names "IP Address" and "Hexadecimal IP Address" are classified under the broader category of "Network Address." The normalization function may involve converting the Hexadecimal IP Address into a standard IP address format. After unifying the column names and normalizing their values, the resulting tables are designated as Tables 2.1 and 2.2. The normalization process would convert hexadecimal values to their decimal equivalents.

TABLE 2.1

| Computer Name | Network Address | CPU Type |
| --- | --- | --- |
| PC-001 | 192.168.1.1 | Intel i5 |
| PC-002 | 192.168.1.2 | Intel i7 |
| PC-003 | 192.168.1.3 | AMD Ryzen 5 |
| PC-004 | 192.168.1.4 | AMD Ryzen 7 |

TABLE 2.1-continued

| Computer Name | Network Address | CPU Type |
| --- | --- | --- |
| PC-005 | 192.168.1.5 | Intel i9 |
| PC-006 | 192.168.1.6 | AMD Ryzen 9 |
| PC-007 | 192.168.1.7 | Intel Xeon |
| PC-008 | 192.168.1.8 | AMD EPYC |
| PC-009 | 192.168.1.9 | Apple M1 |
| PC-010 | 192.168.1.10 | Apple M2 |

TABLE 2.2

| Network Address | Memory Size |
| --- | --- |
| 192.168.1.1 | 64 GB |
| 192.168.1.2 | 32 GB |
| 192.168.1.3 | 32 GB |
| 192.168.1.4 | 8 GB |
| 192.168. 1.5 | 128 GB |
| 10.0.0.1 | 64 GB |
| 10.0.0.2 | 8 GB |

At S430, searchable values are computed for a predefined number ('n') of column values in each column. In an embodiment, the searchable values are computed over all normalized values in a column, where, from the calculated value, a set of ('n') values are selected as the searchable values.

In an embodiment, for each table column, a set of ('n) values are the minimal hash values in the column that are kept, e.g., in memory of backup system 140. To this end, a MinHash function is applied to normalized values in a column, where each hash value is a number. Then, a number of 'n' minimal (smallest) hash values are calculated or otherwise selected on all the rows. By choosing minimal hash values, similar tables will represent a large number of identical hash values in a set of 'n' values. A MinHash function is a probabilistic function used to efficiently estimate the Jaccard similarity between two sets. For example, applying a MinHash function on Tables 2.1 and 2.2 and selecting n=5 would result in 2 identical values between these tables.

It should be noted that searchable values can be computed on any range of values in a column, not just the first 'n' values as demonstrated in the example above.

Referring back to FIG. 3, a database backup is generated at S360. In this embodiment, the backup is created using multiple backup files. These files contain data exported from the databases as well as joinable data, as explained in FIG. 4. In some instances, the backup includes information such as a timestamp, a version identifier, reverse normalization functions, and original column names. This information indicates the date, time, or a combination of both when the backup was created. The data backup can be used to restore the database when needed.

It should be noted that S360 provides a data backup, in contrast to, for example, a machine backup. In some embodiments, the data backup includes a data structure, such as metadata of the database, a data schema of the database, table data, a store procedure, a view, a combination thereof, and the like. In an embodiment, database data (e.g., schema, views, store procedures, etc.) are extracted from a dump, for example utilizing pg_dump, without storing the data itself. Thus, a pg_dump command can be utilized to generate the data files in a first format that can be converted to, for example, to files in a Parquet format.

It should be noted that the process described in FIG. 3 is performed for each table and database application to be backed up. It should be further noted that a data backup is not the same as a storage backup. In a storage backup, a block-for-block copy of the storage device is created, which includes the database data and also includes a lot of data that is not useful for the actual database application, such as temporary files. It is, therefore, advantageous to store a backup only of the data of the database, without all the unnecessary files, folders, etc., which are not essential for the database to function properly.

Figure 5:
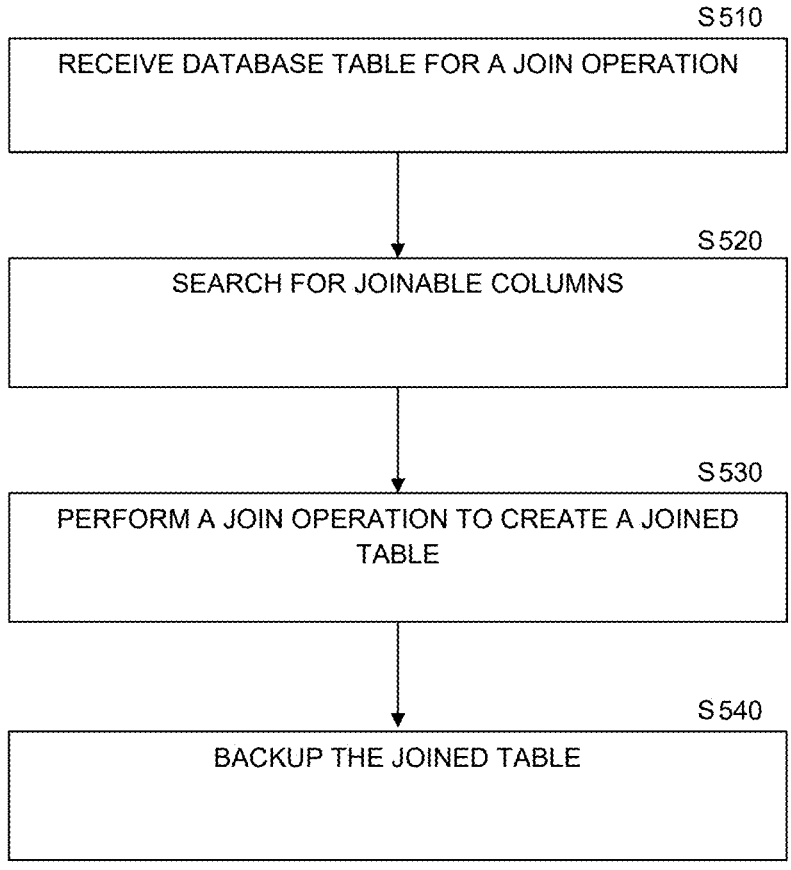
FIG. 5 is an example flowchart of a method for joining tables in accordance with an embodiment.

FIG. 5 is an example flowchart of a method for performing join operations in database backups of database applications, implemented according to an embodiment. The method may be performed by the backup system 140.

At S510, a database table to perform a join operation is received. In an embodiment, the received database table is included in the database backup generated, as discussed in FIG. 3. The received table will be referred to as an input table. A user may select a table in the database backup through a portal or provide a request through a command line interface (CLI) providing a join command with an identifier of the input table, and the like. The purpose of the method is to find one or more tables in the backup to join with the input table.

At S520, a similarity search is conducted in the database to identify joinable columns. This search can either be a similarity search across all tables or a specific set of tables in the backup. A joinable column is defined as one that shares at least a set of column values with a column in the received database table.

In one embodiment, S520 involves determining for each column in the input table whether there is a column in a different table that shares at least 'k' similar searchable values (e.g., mini hash values). The parameter 'k' is an integer value that is smaller than the total number of searchable values ('n') computed for each column. If such 'k' values are found, the column is considered a joinable column.

For example, in Tables 2.1 and 2.2, the columns labeled "Network Address" are regarded as joinable columns because they share a total of 2 similar values (assuming that 'k' is equal to or less than 5). Additionally, S520 includes the process of determining a set of tables included in the backup for the search. In one embodiment, this set may consist only of tables that have at least one matching column name with the input table. In another embodiment, the set of tables may be identified using a hash table that maps hash values to lists of tables containing those hash values.

At S530, a join operation is performed between an input table and a table that contains a joinable column. In an embodiment, a user may select which joinable table(s) to join with the input table. As mentioned earlier, a join operation in a database is used to combine rows from two or more tables based on a related column shared between them. In this context, a join operation can be executed between two tables of different types; for example, the first table may be an SQL table, while the second table may be a NoSQL table. This type of join operation can be carried out during the backup process discussed herein.

The result of S530 is a joined table that is produced for each successful join operation. For instance, if a join operation is performed between Tables 2.1 and 2.2, it would result in the following table.

TABLE 3

| Network Address | Memory Size | Computer Name | CPU Type |
|---|---|---|---|
| 192.168.1.1 | 64 GB | PC-001 | Intel i5 |
| 192.168.1.2 | 32 GB | PC-002 | Intel i7 |
| 192.168.1.3 | 32 GB | PC-003 | AMD Ryzen 5 |
| 192.168.1.4 | 8 GB | PC-004 | AMD Ryzen 7 |
| 192.168.1.5 | 128 GB | PC-005 | Intel i9 |
| 10.0.0.1 | 64 GB | NULL | NULL |
| 10.0.0.2 | 8 GB | NULL | NULL |
| 192.168.1.6 | NULL | PC-006 | AMD Ryzen 9 |
| 192.168.1.7 | NULL | PC-007 | Intel Xeon |
| 192.168.1.8 | NULL | PC-008 | AMD EPYC |
| 192.168.1.9 | NULL | PC-009 | Apple M1 |
| 192.168.1.10 | NULL | PC-010 | Apple M2 |

At S540, each joined table (created in S530) is included in the backup files and, consequently, in the backup. The user has the ability to query, modify, or delete each of the joined tables.

It should be noted that the process for searching for joinable columns, and thus joinable tables, can be performed during the backup process. In such embodiment, for the column, a list of its respective joinable columns is maintained, for example, the database backup.

Figure 6:
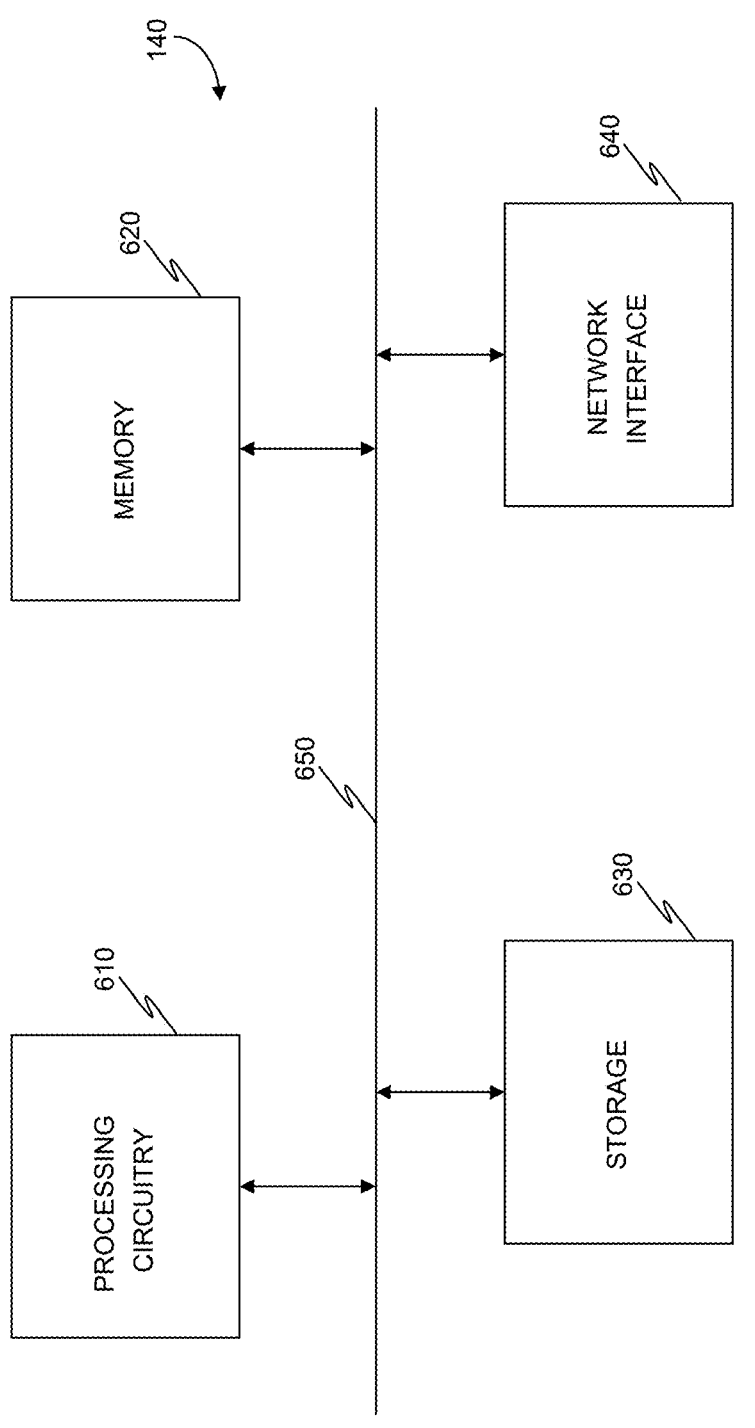
FIG. 6 is an example schematic diagram of a backup system according to an embodiment.

FIG. 6 is an example schematic diagram of a backup system 140 according to an embodiment. The backup system 140 includes, according to an embodiment, processing circuitry 610 coupled to a memory 620, a storage 630, and a network interface 640. In an embodiment, the components of the backup system 140 are communicatively connected via a bus 650.

In certain embodiments, the processing circuitry 610 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information. The processing circuitry 610 is configured to operate as a generative AI system to execute, train, and/or perform inference on any type of language model.

In an embodiment, the memory 620 is a volatile memory (e.g., random access memory, etc.), a non-volatile memory (e.g., read-only memory, flash memory, etc.), a combination thereof, and the like. In some embodiments, the memory 620 is an on-chip memory, an off-chip memory, a combination thereof, and the like. In certain embodiments, the memory 620 is a scratch-pad memory for the processing circuitry 610.

In one configuration, software for implementing one or more embodiments disclosed herein is stored in the storage 630, in the memory 620, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 610, cause the processing circuitry 610 to perform the various processes described herein, in accordance with an embodiment.

In some embodiments, the storage 630 is a magnetic storage, an optical storage, a solid-state storage, a combination thereof, and the like, and is realized, according to an embodiment, as a flash memory, as a hard disk drive, another memory technology, various combinations thereof, or any other medium which can be used to store the desired information.

The network interface 640 is configured to provide the backup system 140 with communication with, for example, the network 130, workload 110, database application 120, etc., according to an embodiment.

It should be understood that the embodiments described herein are not limited to the specific architecture illustrated in FIG. 6, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for generating a digital backup of database applications to allow join operations, comprising:
    accessing a plurality of database applications hosted on a plurality of virtual machines;
    exporting data stored in the database applications to a plurality of files, each file utilizing a column-oriented storage format;
    generating a joinable backup by at least computing searchable values for each table in the plurality of database applications;
    searching for joinable database tables in the joinable backup; and
    generating a digital backup of the database application based on the plurality of files and the joinable backup, wherein the digital backup includes at least a list of joinable database tables.

2. The method of claim 1, further comprising:
    joining, upon a user selection, an input database table with at least one joinable database table specified in the digital backup.

3. The method of claim 1, wherein generating the joinable backup further comprises:
    for each table in the plurality of database applications:
        determining a category for each column;
        normalizing column values of each column; and
        computing searchable values.

4. The method of claim 3, wherein determining the category of each column further comprises:
    prompting a large language model (LLM) with at least a set of values of a column; and
    saving original column names in metadata of the digital backups.

5. The method of claim 3, wherein normalizing the column values of each column further comprises:
    applying a normalization function selected based on the category of a respective column;
    saving the normalized column values in digital backups; and
    saving a reverse normalization function in metadata of the digital backups.

6. The method of claim 5, further comprising:
    generating searchable values by applying a MinHash function on normalized values in each column of each database table in the digital backups; and
    calculating a set of 'n' minimal hash values on all rows of each database table, wherein a parameter 'n' is preconfigured.

7. The method of claim 6, wherein searching for joinable columns further comprises:
    searching for columns having a number of 'k' identical searchable values; wherein 'k' is a number smaller than the number of 'n'.

8. The method of claim 7, wherein searching for joinable columns further comprises:
    identifying candidate joinable columns based on a hash map; and determining if each candidate joinable column includes a set of 'k' identical searchable values; wherein 'k' is a number smaller than the number of 'n'.

9. The method of claim 1, wherein the joinable database tables are of different database applications.

10. A non-transitory computer-readable medium storing a set of instructions for generating a digital backup of database applications to allow join operations, the set of instructions comprising:

one or more instructions that, when executed by one or more processors of a device, cause the device to:

access a plurality of database applications hosted on a plurality of virtual machines;

export data stored in the database applications to a plurality of files, each file utilizing a column-oriented storage format;

generate a joinable backup by at least computing searchable values for each table in the plurality of database applications;

search for joinable database tables in the joinable backup; and generate a digital backup of the database application based on the plurality of files and the joinable backup, wherein the digital backup includes at least a list of joinable database tables.

11. A system for generating a digital backup of database applications to allow join operations comprising:

one or more processors; and a memory to store instructions, the instructions are executed by the one or more processors to:

access a plurality of database applications hosted on a plurality of virtual machines;

export data stored in the database applications to a plurality of files, each file utilizing a column-oriented storage format;

generate a joinable backup by at least computing searchable values for each table in the plurality of database applications;

search for joinable database tables in the joinable backup; and generate a digital backup of the database application based on the plurality of files and the joinable backup, wherein the digital backup includes at least a list of joinable database tables.

12. The system of claim 11, wherein the one or more processors are further configured to:

join, upon a user selection, an input database table with at least one joinable database table specified in the digital backup.

13. The system of claim 11, wherein the one or more processors, when generating the joinable backup, are configured to:

for each table in the plurality of database applications:

determine a category for each column;

normalize column values of each column; and compute searchable values.

14. The system of claim 13, wherein the one or more processors, when determining the category of each column, are configured to:

prompt a large language model (LLM) with at least a set of values of a column; and save original column names in metadata of the digital backups.

15. The system of claim 13, wherein the one or more processors, when normalizing the column values of each column, are configured to:

apply a normalization function selected based on the category of a respective column;

save the normalized column values in digital backups; and save a reverse normalization function in metadata of the digital backups.

16. The system of claim 15, wherein the one or more processors are further configured to:

generate searchable values by applying a MinHash function on normalized values in each column of each database table in the digital backups; and calculate a set of 'n' minimal hash values on all rows of each database table, wherein a parameter n' is preconfigured.

17. The system of claim 16, wherein the one or more processors, when searching for joinable columns, are configured to:

search for columns having a number of k' identical searchable values; wherein k' is a number smaller than the number of n'.

18. The system of claim 17, wherein the one or more processors, when searching for joinable columns, are configured to:

identify candidate joinable columns based on a hash map; and determine if each candidate joinable column includes a set of k' identical searchable values; wherein k' is a number smaller than the number of n'.

19. The system of claim 11, wherein the joinable database tables are of different database applications.

* * * * *